United States Patent [19]
Lafosse et al.

[11] Patent Number: 5,183,971
[45] Date of Patent: Feb. 2, 1993

[54] PROTECTIVE CASING FOR ELECTRIC DISTRIBUTION BUSBARS

[75] Inventors: Jean Lafosse, Mirebeau sur Beze; Paul Milliere, Varois et Chaignot, both of France

[73] Assignee: Telemecanique, Rueil-Malmaison, France

[21] Appl. No.: 633,172

[22] Filed: Dec. 28, 1990

[30] Foreign Application Priority Data

Dec. 28, 1989 [FR] France .................. 89 17345

[51] Int. Cl.⁵ .......................................... H01B 17/24
[52] U.S. Cl. .......................... 174/138 F; 174/71 B; 174/71 R; 174/88 B; 174/99 B; 174/129 B; 174/133 B; 174/70 B; 439/207; 439/208; 439/212; 439/724
[58] Field of Search ............... 174/138 F, 65 R, 71 R, 174/74 R, 71 B, 88 B, 99 B, 129 B, 133 B, 16.2, 68.2, 70 B; 439/213, 210, 724, 207, 208, 212; 361/341; 248/906

[56] References Cited

U.S. PATENT DOCUMENTS

| | | | |
|---|---|---|---|
| 2,318,859 | 5/1943 | Huguelet | 248/68 |
| 2,449,464 | 9/1948 | Eypper | 174/135 X |
| 3,112,148 | 11/1963 | Wochner | 439/521 |
| 3,168,613 | 2/1965 | Palmer | 174/65 |
| 3,631,299 | 12/1971 | Meyer | 361/399 |
| 3,770,875 | 11/1973 | Carlson | 174/88 B |
| 4,029,896 | 6/1977 | Skinner | 174/138 F |
| 4,148,546 | 4/1979 | Wilson, Jr. et al. | 439/724 |
| 4,776,815 | 10/1988 | Baillet et al. | 439/724 |
| 4,818,822 | 4/1989 | Yahraus | 174/53 |

FOREIGN PATENT DOCUMENTS

| | | |
|---|---|---|
| 2295595 | 7/1976 | France . |
| 2562344 | 10/1985 | France . |
| 1085372 | 9/1967 | United Kingdom ............. 174/99 B |
| WO89/02177 | 3/1989 | World Int. Prop. O. . |

Primary Examiner—Leo P. Picard
Assistant Examiner—Hyung S. Sough
Attorney, Agent, or Firm—Young & Thompson

[57] ABSTRACT

A protective casing for preventing any accidental introduction of metal parts into a column containing an array of electric distribution busbars is made up of two identical insulating half-casings (3) coupled together by interengagement of external engagement regions (18A, 20A, 22A, 24A) and of internal engagement regions (18B, 20B, 22B, 24B) up to a mutual coupling position which is variable according to the dimension of the busbars. The busbars are inserted in housings (29, 30) and pass through recesses (9A, 11A, 11B, 9B, 13) in the lateral walls of the casing. Fixing bolts extending between the busbars are surrounded by insulating sleeves (21) formed by interpenetrating outer and inner tongues (23 and 25) separated by slits (36). The sleeves (21) are made integral with the half-casings by molding of plastic material.

24 Claims, 5 Drawing Sheets

FIG.1

FIG_7

FIG_8

FIG_9

FIG_10

PROTECTIVE CASING FOR ELECTRIC DISTRIBUTION BUSBARS

BACKGROUND OF THE INVENTION

1. Field of the Invention

The present invention relates to a protective casing for electric distribution busbars.

2. Description of the Prior Art

In certain applications, it is necessary to place a protective casing of insulating material around an array of electric distribution busbars such as those encountered in electric cubicles.

In one design of electric cubicle which is already known, an array of main electric distribution busbars extends horizontally across the cubicle in its upper region. To this horizontal array is connected a vertical array which extends downwards to the bottom of the cubicle within a column provided with connecting means for mounting a number of different devices placed on each side of the column.

It is a known practice in this case to place at the top of the column a protective casing which closes the top of the column except for openings through which the vertical busbars can be connected to the main busbars. The purpose of this protective casing is to prevent conductive elements such as screws or washers from falling into the column when making a connection between the main array and the vertical array.

The protective casing is made up of two half-casings, one of which is provided on the periphery of its open face with recesses for receiving the busbars. The two half-casings are moved into position on each side of the vertical array and assembled together so as to imprison the busbars between them.

This system for protecting the upper ends of columns by means of half-casings of molded material involves the need to manufacture and store a large number of different half-casings. In fact, depending on the power transmitted, the busbars can have different dimensions corresponding to different dimensions of the casing which is in position. Provision must accordingly be made for two different half-casings for each dimension of busbars.

The aim of the invention is to propose a protective casing which minimizes the number of different half-casings to be manufactured and stored in order to meet all particular cases of installed power.

SUMMARY OF THE INVENTION

In accordance with the invention, the protective casing for electric distribution busbars, constructed of insulating material and intended to surround a region of an array of electric distribution busbars, said casing being made up of two half-casings provided on the periphery of an open face with recesses which form entrance and exit passageways for the busbars after coupling of the half-casings, is distinguished by the fact that the two half-casings are coupled together by displacement in mutual sliding motion in a coupling direction substantially perpendicular to said array up to a mutual coupling position which is variable according to the dimension of the busbars parallel to the direction of sliding displacement.

Thus a single type of casing is capable of receiving busbars having widths which can be very different, the displacement of the half-casings in sliding motion towards each other being simply interrupted at an earlier moment when the busbars are of greater width or on the contrary at a later moment when the busbars are of smaller width. It can readily be ensured that, in all cases, the recesses or at least those recesses which are directed towards the exterior, are occupied substantially entirely by the cross-section of the busbars which pass through them (in the case of a protective casing which is intended for the top of a column, the recess or recesses which are directed towards the interior of the column do not necessarily close the casing relatively to the interior of the column).

DETAILED DESCRIPTION OF THE INVENTION

Figures 2, 3:
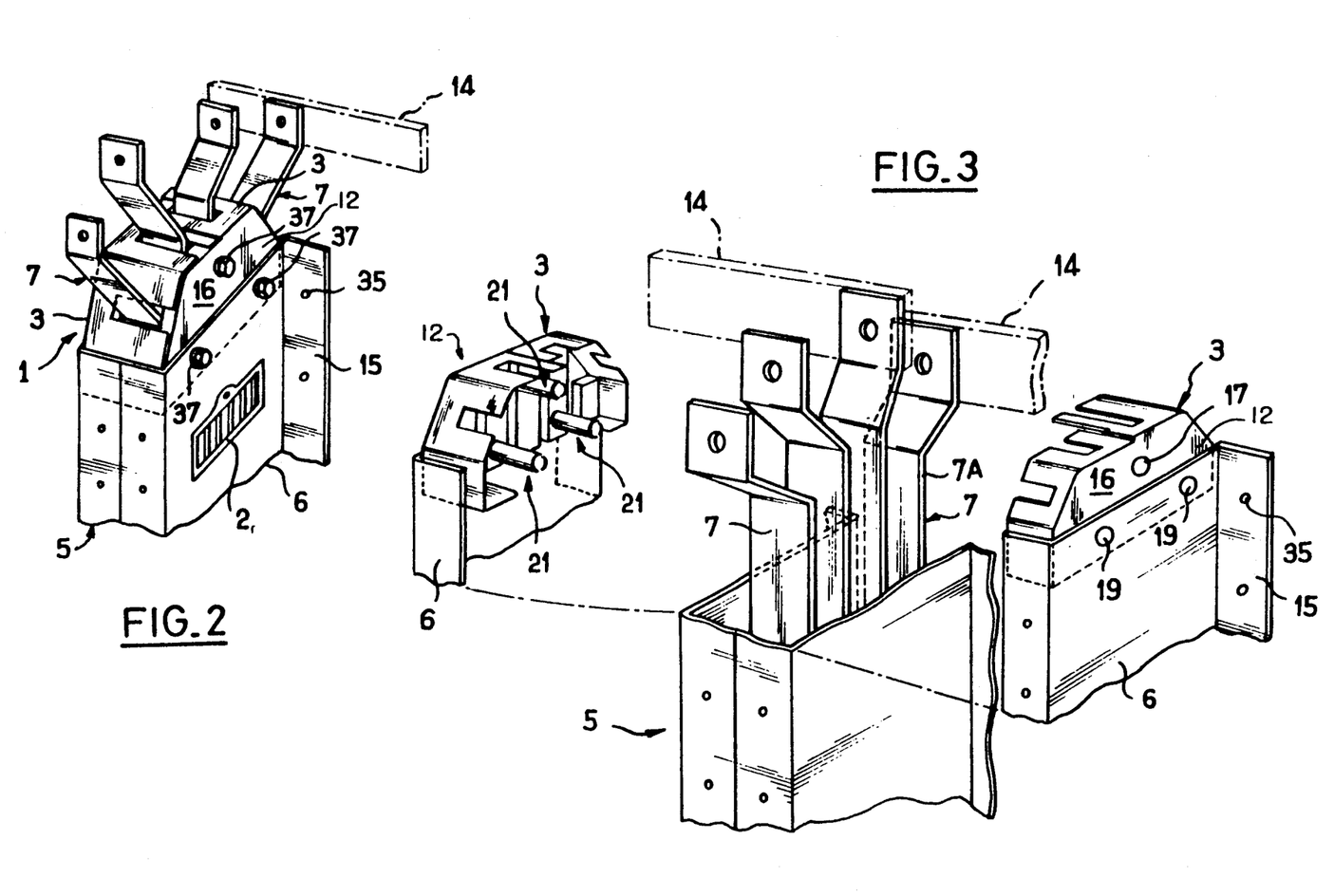
FIG. 2 is a view in perspective of a column containing electric distribution busbars equipped with the casing of FIG. 1.
FIG. 3 is an exploded view in perspective of the device of FIG. 2.

The present invention is described in connection with an electrical installation composed of a vertical electric duct or column 5 formed by two half-ducts 6 surrounding an array of vertical electric distribution busbars 7. The busbars 7 are supplied from horizontal main busbars 14 to which they are connected at their upper ends (as shown in FIGS. 2 and 3). The column 5 of sheet metal, for example, is fixed by means of flanges 15 and screws 35 against the inner face of the rear wall of an electric cubicle (not shown in the drawings). Along opposite lateral walls, the column 5 has openings fitted with slide-type shutters 2 which are known per se and serve to connect many items of electrical equipment to the busbars 7 under the requisite conditions of safety (the openings 2 are not shown in FIG. 3). The busbars 7 have a rectangular cross-section, the "width" of which (greater than the "thickness" and perpendicular to the plane of the array) is selected from a number of available widths as a function of the maximum permissible power required for the column.

Figure 4:
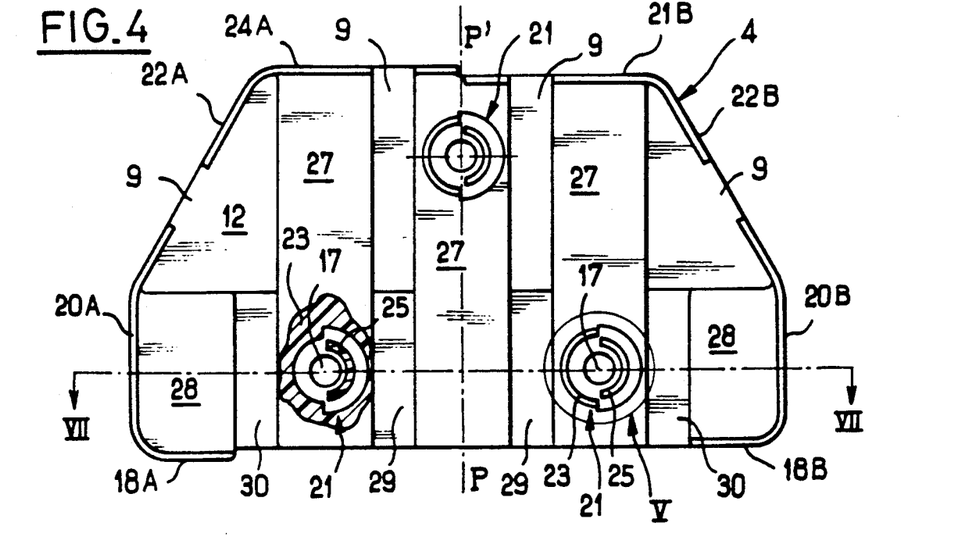
FIG. 4 is a view in elevation of a half-casing on the side corresponding to its open face with a portion broken away and a partial cross-section of an insulating sleeve.
Figure 5:
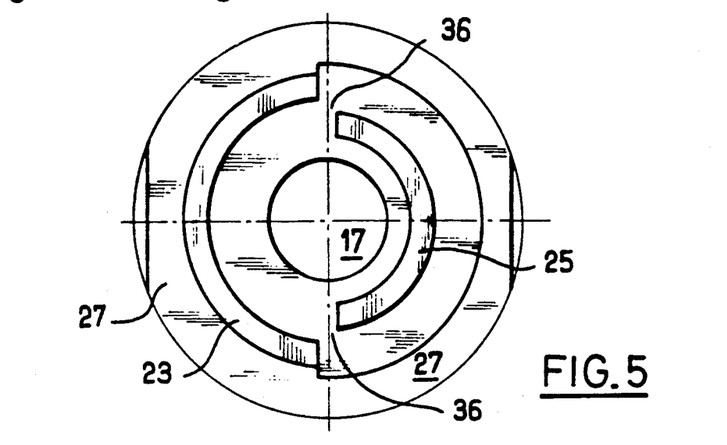
FIG. 5 is a view to a larger scale showing the detail V of FIG. 4.

In order to prevent accidental introduction of metal parts or the like through the upper end of the column 5, there is fixed in proximity to said upper end a casing 1 forming a cover (see FIG. 1) made of insulating material such as molded plastic material. Said casing 1 is constituted by two identical half-casings 3 each provided on the periphery of an open face with recesses 9A, 9B, 11A, 11B, 13 which allow the array of vertical busbars 7 to pass through substantially flat lateral walls 18A, 18B, 20A, 20B, 22A, 22B, 24A, 24B (FIGS. 4 and 6) of said half-casing 3. These lateral walls form an internal engagement region (18B, 20B, 22B, 24B). At their inner ends 33, said recesses reach an inner face of an end-wall 12 of the half-casing. An outer face 16 of the half-casing defines a substantially flat surface which is intended to be fixed against a corresponding inner face of a respective half-duct 6 (as shown in FIGS. 2 and 3).

Figure 1:
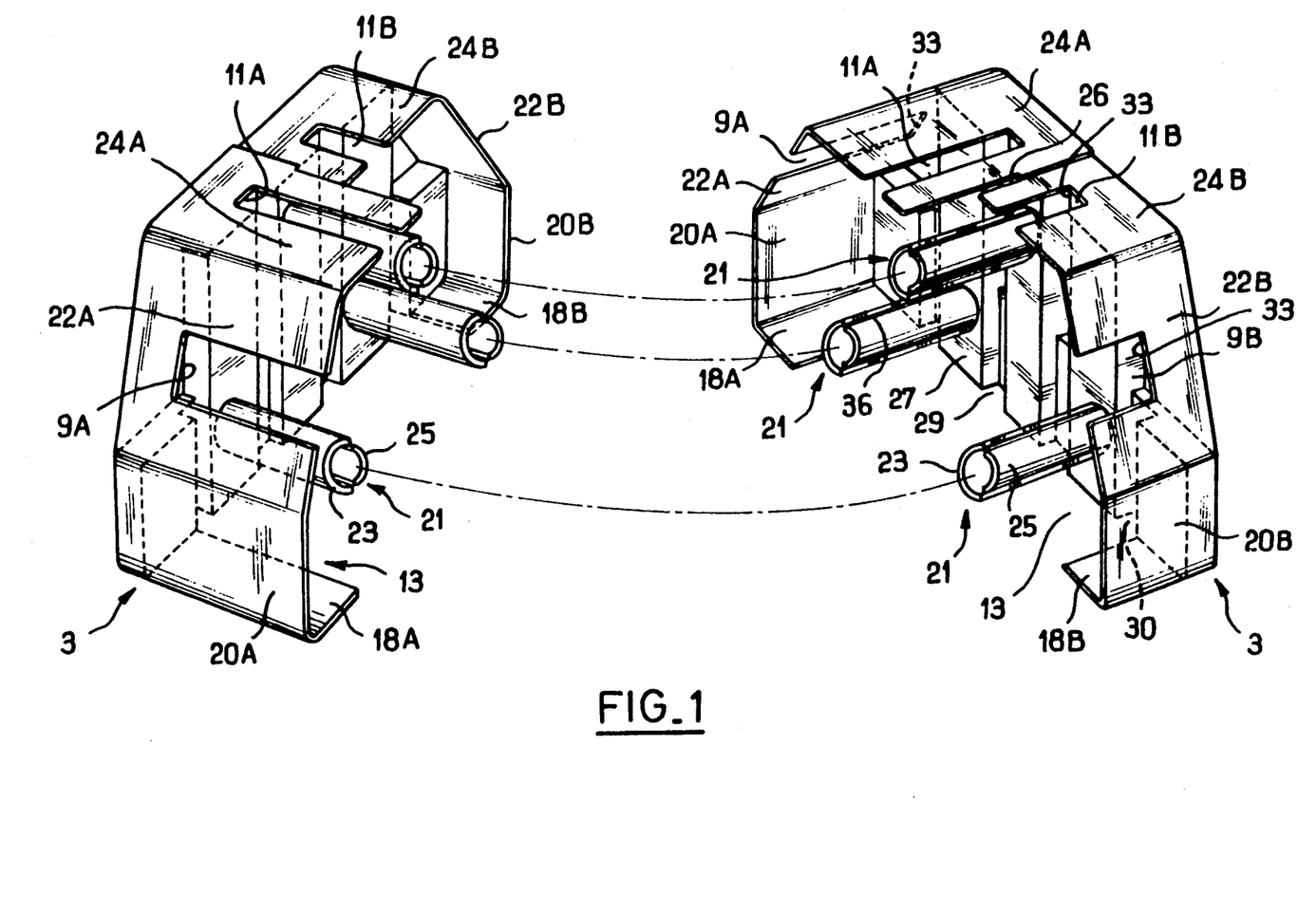
FIG. 1 is a view in perspective of two half-casings which are intended to be coupled together in order to constitute a casing in accordance with the invention.
Figure 6:
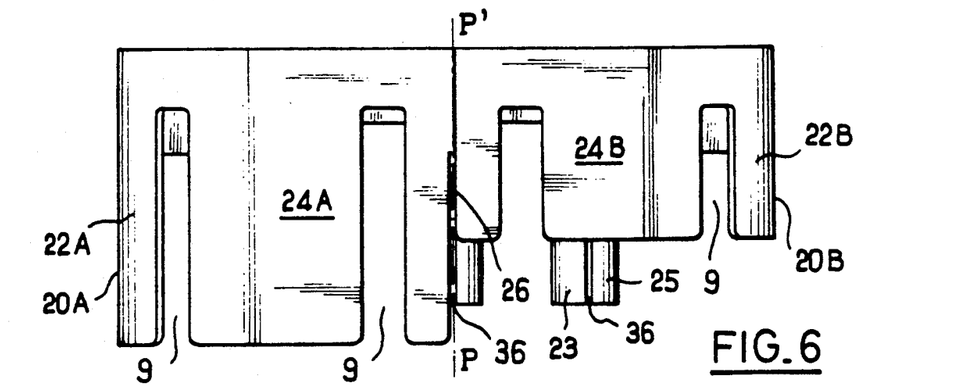
FIG. 6 is a top view of the half-casing of FIG. 4.

The top walls 24A and 24B are separated by a slit 26 (as shown in FIGS. 1 and 6) which extends from the periphery of the open face towards the end-wall 12 over a distance greater than one-half the corresponding dimension of the wall 24A.

The slit 26 extends in a median plane P—P' of the half-casing, which separates the regions of internal and external engagement.

On the side opposite to the slit 26, the half-casing also has a hollowed-out portion through which the median plane P—P' passes. This hollowed-out portion is formed by the recess 13 through which all the busbars 7 pass into the column.

The outer face of the internal engagement region and the inner face of the external engagement region are substantially symmetrical with each other with respect to the plane P—P'. Thus, when the two casings are located opposite to each other in the position of engagement, the internal engagement region of each half-casing slidably engages in the external engagement region of the other half-casing. These faces have generator-lines which are parallel to each other and to the plane P—P' as well as to the width of the busbars and the direction of relative sliding motion between the two half-casings which, as can be understood, is parallel to said generator-lines, is therefore parallel to the plane P—P' and to the width of the busbars.

The slit 26 and the recess 13 permit a transition between the half-space (on one side of the plane P—P') in which one of the half-casings surrounds the other and the other half-space in which the other half-casing surrounds the first.

The inner face of the end-wall 12 of each half-casing is provided with shaped positioning elements formed by three central bosses 27 and two lateral bosses 28 defining together four parallel seatings spaced at a distance corresponding to that of the busbars 7 and comprising two central seatings 29 and two lateral seatings 30. These seatings can receive lateral edges 7A of the busbars 7 located on the same side of the array of busbars in order to carry out relative positioning of the half-casing and of the busbars 7. The lower ends of the seatings 29, 30 have portions which project towards the interior of the half-casing, said projecting portions being delimited by relatively displaced walls 29A, 30A against which the edges 7A of the busbars 7 are abuttingly applied.

In the end-wall 12 of each half-casing are formed three cylindrical fixing orifices 17 disposed symmetrically with respect to the median plane P—P' The top orifice 17 is located in the median plane and passes through one of the bosses 27 which is placed between the two others. The two bottom orifices 17 pass through the other two central bosses 27. Two fixing orifices 19 corresponding to the two bottom orifices 17 and having the same diameter as well as the same relative spacing are formed at the upper end of each half-duct 6 so that the two half-casings 3 and the two half-ducts 6 can be coupled together by means of two bolts 37, each bolt being intended to pass through an orifice 19 of each half-duct and a bottom orifice 17 of each half-casing. The two top orifices 17 of the two half-casings serve to complete the rigid interassembly of said half-casings by means of a third bolt 37.

In order to provide electrical insulation of the aforementioned bolts with respect to the busbars 7 between which they extend, the walls of the orifices 17 are provided within the half-casing and beyond the positioning bosses 27 with extensions in the form of elementary insulating sleeves 21. Each sleeve 21 is constituted by an outer tongue 23 and an inner tongue 25, these two semi-cylindrical tongues being coaxial with the orifice 17 and being angularly displaced by 180° with respect to each other. The two tongues are separated from each other by two opposite axial slits 36 starting from the free end of the elementary sleeve and extending in an axial plane parallel to the median plane P—P' in the case of the bottom orifices and extending in the plane P—P' itself in the case of the top orifice. From a geometrical standpoint, the elementary ducts of each half-casing are deduced from each other by translation. The inner tongue 25 has an outer radius which is slightly shorter than the inner radius of the outer tongue 23.

The two tongues 23, 25 are formed integrally with the corresponding half-casing 3. The base of each insulating sleeve 21 is located within a recess 31 having a generally bi-semicylindrical shape and formed within the corresponding central boss 27 in coaxial relation to the orifice 17. The recess 31 has a portion which is adjacent to the outer face of the base of the inner tongue 25 and is adapted to receive the free end of the outer tongue 23 of one of the sleeves 21 of the other half-casing 3, and a portion which is adjacent to the inner face of the outer tongue 23 and is adapted to receive the free end of the inner tongue 25 of the sleeve considered. The elementary sleeves 21 are formed integrally with the corresponding half-casing during the molding process. Within each half-casing, each elementary sleeve 21 surrounds the corresponding bolt and provides substantially complete insulation of the bolt with the exception of the narrow slits 36. However, in each sleeve, the slits are located in an axial plane perpendicular to the plane of the array and parallel to the width of the busbars 7. In other words, the slits are located as far as possible from the two adjacent busbars 7, thus lengthening the arcing distance between the bolts and the busbars.

Figure 7:
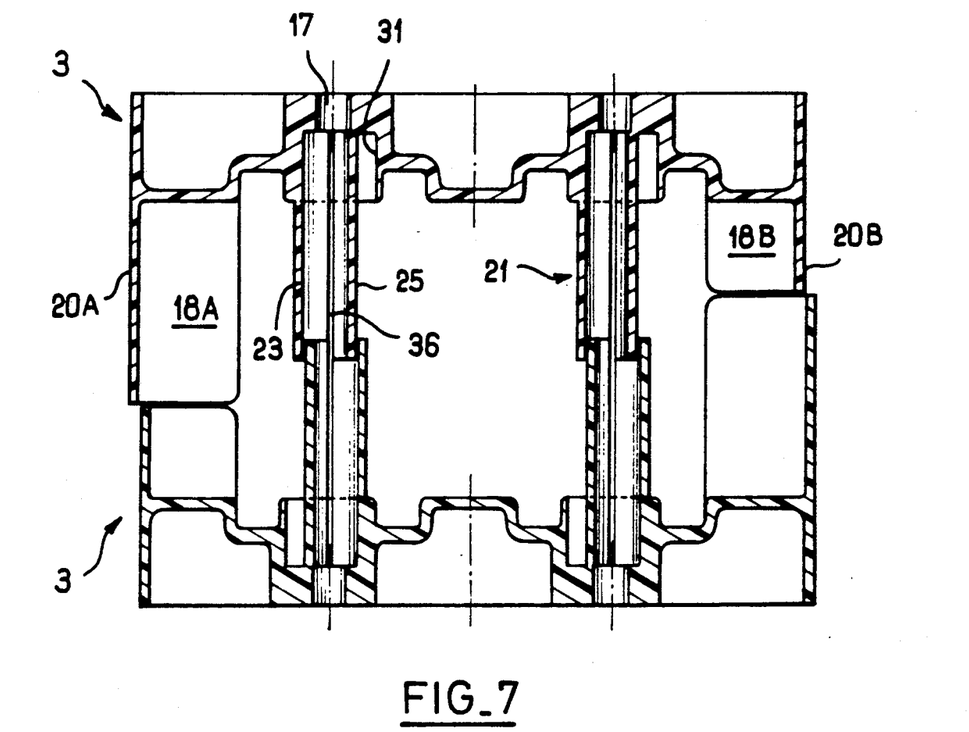
FIG. 7 is a view in cross-section taken along line VII—VII of FIG. 4 and showing two half-casings in a position corresponding to the beginning of coupling.
Figure 8:
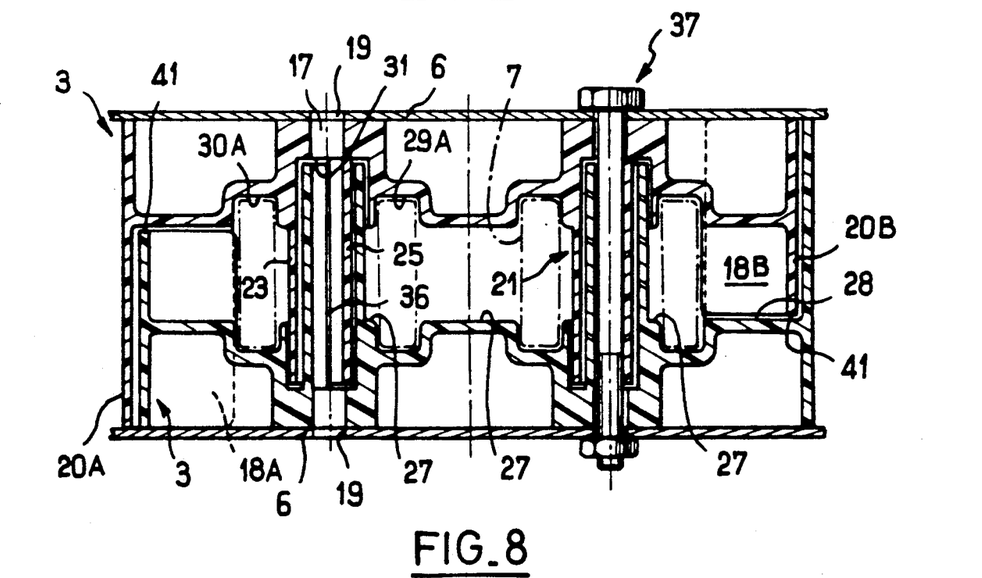
FIG. 8 is a view which is similar to FIG. 7, the two half-casings being in a position corresponding to the end of coupling.
Figure 9:
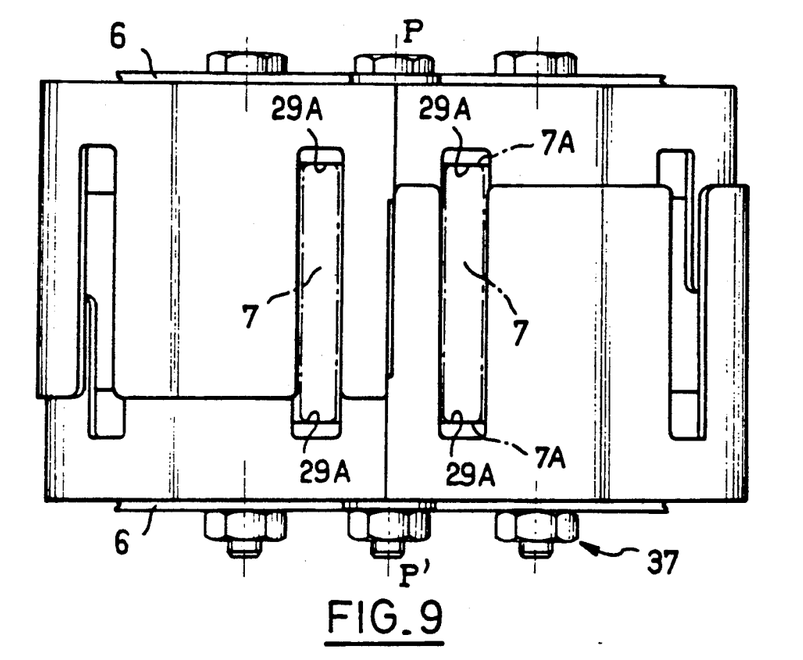
FIG. 9 is a top view of two half-casings in the intermediate position of coupling.
Figure 10:
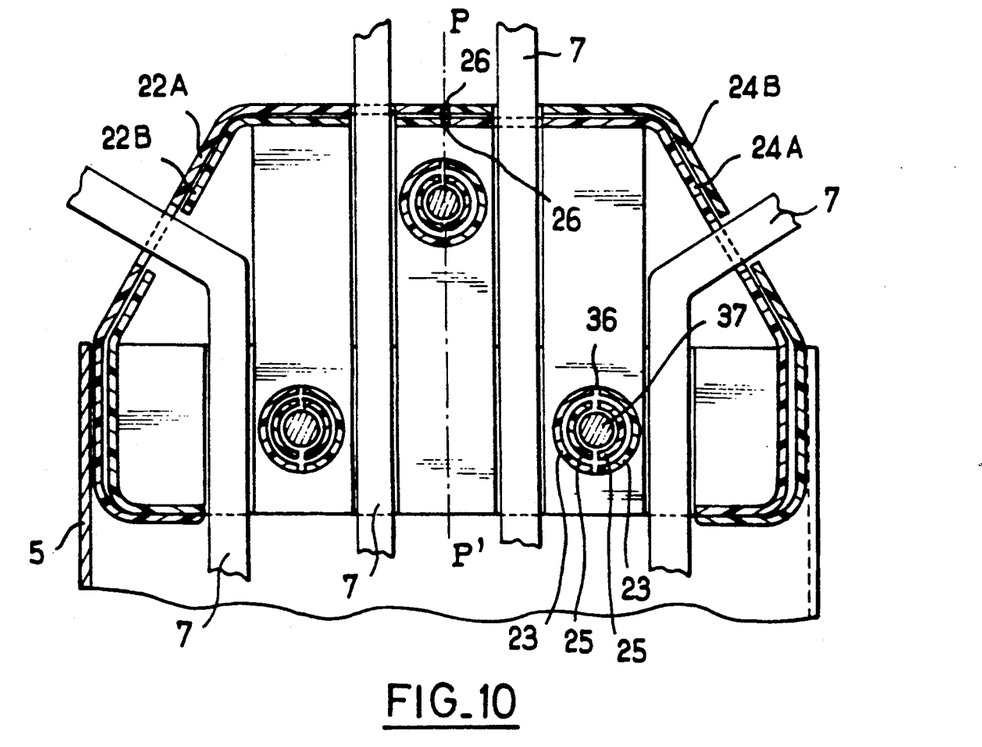
FIG. 10 is a view in cross-section with a portion broken away and showing the device of FIG. 2, this view being taken in the longitudinal mid-plane of the column.

FIGS. 7 to 9 illustrate different states of coupling of two identical half-casings 3 but the busbars 7 are not shown in FIG. 7. Consideration is given here to the position corresponding to the beginning of coupling (sectional view of FIG. 7), to the position of mutual coupling on busbars of relatively substantial width (top view of FIG. 9) and to the position of maximum compactness (sectional view of FIG. 8). The external engagement region 18A, 20A, 22A, 24A of each half-casing is of greater length from the end-wall and parallel to the direction of sliding displacement than the internal engagement region 18B, 20B, 22B, 24B. Thus, in the position of maximum compactness, the free ends 41 (FIG. 8) of the lateral walls 18B, 20B, 22B, 24B which form the internal engagement region come into abutting contact with the inner faces of the bosses 27, 28 of the associated half-casing whilst the free ends of the external engagement region of each half-casing are located in the plane of the outer face 16 of the end-wall of the associated half-casing. Moreover, in the case of each elementary insulating sleeve 21, the free ends of the tongues 23, 25 penetrate into the corresponding recess 31 but do not reach the bottom of said recess, a free space being left in order to prevent the end portions of the tongues from sustaining stresses which would be liable in particular to cause undesirable flexural deformations of these end portions.

The position of maximum compactness of FIG. 8 constitutes the configuration of the casing which corresponds to the minimum dimension of the busbar housings as measured in the direction of the width of the busbars (direction of sliding displacement). Such a configuration is clearly compatible with busbars of smaller width than the minimum value considered above, the sole drawback being that the top end of the column would be less hermetically closed.

By virtue of the depth of penetration of the elementary sleeves 21 into the recesses 31, the relatively substantial length of the sleeves 21 is not incompatible with the relatively small dimension of the busbar housings in the position of maximum compactness. Furthermore, the peripheral wall of each recess 31 serves as a guide and as a support for the end portion of the outer tongue 23 which penetrates into the recess.

The different positions of intermediate coupling (one example of which is shown in FIG. 9) form a corresponding number of casing configurations adapted to different busbars 7 having different widths greater than the width of the busbars of FIG. 8. The different coupling positions are distinguished from each other by more or less extensive overlapping of the engagement regions and of the associated elementary insulating sleeves 21. In regard to the width of the busbars, there exists a maximum value corresponding to the minimum interengagement of the internal and external engagement regions of the half-casings which is necessary in order to ensure sufficient mutual positioning of these half-casings. By virtue of the optimized and differentiated length of the external engagement region 18A, 20A, 22A, 24A and internal engagement region 18B, 20B, 22B, 24B, and also by virtue of the substantial length of the individual sleeves 21 which is made possible by the recesses 31, this maximum value of the width of the busbars is made as large as possible with respect to the minimum dimension assumed by the busbar housings when the casing is in a position of maximum compactness.

It is an advantage, however, to have a configuration in which the free ends of the tongues 23, 25 of each sleeve 21 extend at least to the corresponding cylindrical recess 31 or penetrate into the recess. In this case, the bolts which serve to fix the half-casings and pass between the busbars 7 are each completely surrounded by two rows of tongues, thus improving their insulation and constituting a guarantee against accidental failure of one of the four corresponding tongues.

In order to mount an insulating casing in accordance with the invention on an electrical installation as described and comprising branch busbars 7 connected to main busbars 14, it may be found sufficient to unscrew the screws 35 which secure the upper portion of the duct 5 in order to separate the ends of the half-ducts 6 and to insert each half-casing 3 between the array of busbars 7 and each half-duct 6 while placing the orifices 17 and 19 in register with each other. The recesses 9 are then positioned with respect to the busbars 7 and the two half-casings are slidably interengaged until they come into abutting contact with the busbars on each side thereof. The bolts 37 are then tightened in order to rigidly fix the two half-casings to the column 5. Finally, it remains necessary only to screw the flanges 15 of the column 5 on the wall of the electric cubicle in order to complete the assembly. The range of travel of the two half-casings towards each other is limited by applying the half-casings against the busbars. Thus an optimal coupling position, taking the width of the busbars into account, is defined for the casing among the different possible positions. Since the sleeves 21 form an integral part of the half-casings, they are positioned with certainty and it is no longer necessary to carry out any checking operation in this respect. The casing 1 occupies the internal cross-section of the column 5 to a substantially complete extent. This involves mutual adaptation of the dimensional characteristics of the casing and of the column. The column can have different widths according to the width of the busbars.

By virtue of the invention, a single mold for the half-casings which are all identical permits the construction of casings which can accommodate busbars having different widths without any danger of forgetting to place the bolt-insulating sleeves in position at the time of assembly.

As will be readily apparent, the invention is not limited to the example which has just been described and in which many changes can be made without thereby departing from the scope of the invention.

On each half-casing, the elementary sleeves located on each side of the median plane could be two tubes having different diameters so that the small-diameter tube of each half-casing can slide within the large-diameter tube of the other half-casing at the time of interengagement.

What is claimed is:

1. A protective casing (1) for electric distribution busbars (7), constructed of insulating material and adapted to surround a region of an array of electric distribution busbars, said casing being made up of two identical half-casings (3) each provided on the periphery of an open face with recesses (9A, 9B, 11A, 11B, 13) which form entrance and exit passageways for the busbars (7) after coupling of the half-casings (3), wherein the two half-casings are coupled together by displacement in mutual sliding motion in a coupling direction substantially perpendicular to said array up to a mutual coupling position which is variable according to the dimension of the busbars parallel to the direction of sliding displacement, wherein a coupling region of each half-casing comprises an external engagement region (18A, 20A, 22A, 24A) on one side of a median plane (P—P') and an internal engagement region (18B, 20B, 22B, 24B) on the other side of said median plane, the two engagement regions being separated by recessed regions (26, 13) through which said median plane (P—P') passes, and wherein said external engagement region (18A, 20A, 22A, 24A) of each half-casing is of greater length parallel to the coupling direction than said internal engagement region (18B, 20B, 22B, 24B).

2. A protective casing according to claim 1, wherein the mutual coupling position is defined by abutting contact of the busbars with at least a portion (29A, 30A) of the end-wall of each half-casing (3).

3. A protective casing according to claim 1, wherein the range of travel of the half-casings in sliding motion with respect to each other in the coupling direction is limited by abutting contact of the internal engagement region (18B) of each half-casing with an inner face (29A, 30B) of the other half-casing.

4. A protective casing according to claim 1, wherein said casing comprises abutment means for limiting the range of travel of the half-casings in sliding motion with respect to each other in the coupling direction in a position of maximum compactness in which a free end of the external engagement region of each half-casing (3) is substantially located along the periphery of an outer front face (16) of the other half-casing (3).

5. A protective casing according to claim 1, in which the half-casings are connected by screw attachment means (37) extending within at least one insulating sleeve (21) between adjacent conductive busbars (7), wherein the insulating sleeve (21) is formed integrally with at least one of the half-casings (3).

6. A protective casing according to claim 5, wherein the sleeve has two portions (21) each forming part of one of the half-casings (3) and capable of sliding with respect to each other during the movement of coupling of half-casings.

7. A protective casing according to claim 1, in which the half-casings (3) are connected by screw attachment means (37) extending within at least one insulating sleeve between adjacent conductive busbars (7), wherein the insulating sleeve comprises two identical elementary sleeves (21) each forming part of one of the half-casings (3), each elementary sleeve comprising at least one outer tongue (23) and an inner tongue (25) which is angularly displaced with respect to the outer tongue and adapted to slide within the outer tongue of the elementary sleeve of the other half-casing.

8. A protective casing according to claim 7, wherein the tongues (23, 25) of each elementary sleeve are semi-cylindrical and angularly opposed and separated by two opposite axial slits (36) extending from the free end of the sleeve.

9. A protective casing according to claim 8, wherein the two slits (36) are located in one and the same plane perpendicular to the plane of the busbar array.

10. A protective casing according to claim 7, wherein the screw attachment means (37) comprise two elementary means disposed symmetrically on each side of the median plane (P—P'), and two sleeves constituted by elementary sleeves (21) with, in the case of each half-casing (3), two elementary sleeves of each half-casing which are deduced from each other by translation.

11. A protective casing according to claim 7, wherein provision is made for a recess (31) adjacent to the outer face of the base of the inner tongues (25) and for a recess (31) adjacent to the inner face of the base of the outer tongues (23), for receiving the free ends of the tongues of the sleeve of the other half-casing (3) at the end of travel in sliding motion up to the position of maximum compactness.

12. A protective casing (1) for electric distribution busbars (7), constructed of insulating material and adapted to surround a region of an array of electric distribution busbars, said casing being made up of two identical half-casings (3) each provided on the periphery of an open face with recesses (9A, 9B, 11A, 11B, 13) which form entrance and exit passageways for the busbars (7) after coupling of the half-casings (3), wherein the two half-casings are coupled together by displacement in mutual sliding motion in a coupling direction substantially perpendicular to said array up to a mutual coupling position which is variable according to the dimension of the busbars parallel to the direction of sliding displacement, wherein a coupling region of each half-casing comprises an external engagement region (18A, 20A, 22A, 24A) on one side of a median plane (P—P') and an internal engagement region (18B, 20B, 22B, 24B) on the other side of said median plane, the two engagement regions being separated by recessed regions (26, 13) through which said median plane (P—P') passes, wherein said casing comprises abutment means for limiting the range of travel of the half-casings in sliding motion with respect to each other in the coupling direction in a position of maximum compactness in which a free end of the external engagement region of each half-casing (3) is substantially located along the periphery of an outer front face (16) of the other half-casing (3).

13. A protective casing according to claim 12, in which the half-casings are connected by screw attachment means (37) extending within at least one insulating sleeve (21) between adjacent conductive busbars (7), and wherein the insulating sleeve (21) is formed integrally with at least one of the half-casings (3).

14. A protective casing according to claim 13, wherein the sleeve has two portions (21) each forming part of one of the half-casings (3) and capable of sliding with respect of each other during the movement of coupling the half-casings.

15. A protective casing according to claim 12, in which the half-casings (3) are connected by screw attachment means (37) extending within at least one insulating sleeve between adjacent conductive busbars (7), wherein the insulating sleeve comprises two identical elementary sleeves (21) each forming part of one of the half-casings (3), each elementary sleeve comprising at least one outer tongue (23) and an inner tongue (25) which is angularly displaced with respect to the outer tongue and adapted to slide within the outer tongue of the elementary sleeve of the other half-casing.

16. A protective casing according to claim 15, wherein the tongues (23, 25) of each elementary sleeve are semi-cylindrical and angularly opposed and separated by two opposite axial slits (36) extending from the free end of the sleeve.

17. A protective casing according to claim 16, wherein the two slits (36) are located in one and the same plane perpendicular to the plane of the busbar array.

18. A protective casing according to claim 15, wherein the screw attachment means (37) comprise two elementary means disposed symmetrically on each side of the median plane (P—P'), and two sleeves constituted by elementary sleeves (21) with, in the case of each half-casing (3), two elementary sleeves of each half-casing which are offset from each other by translation.

19. A protective casing according to claim 15, there being a recess (31) adjacent to the outer face of the base of the inner tongues (25) and a recess (31) adjacent to the inner face of the base of the outer tongues (23), for receiving the free ends of the tongues of the sleeve of the other half-casing (3) at the end of travel in sliding motion up to the position of maximum compactness.

20. A protective casing (1) for electric distribution busbars (7), constructed of insulating material and adapted to surround a region of an array of electric distribution busbars, said casing being made up of two identical half-casings (3) each provided on the periphery of an open face with recesses (9A, 9B, 11A, 11B, 13)

which form entrance and exit passageways for the busbars (7) after coupling of the half-casings (3), wherein the two half-casings are coupled together by displacement in mutual sliding motion in a coupling direction substantially perpendicular to said array up to a mutual coupling position which is variable according to the dimension of the busbars parallel to the direction of sliding displacement, and wherein a coupling region of each half-casing comprises an external engagement region (18A, 20A, 22A, 24A) on one side of a median plane (P—P') and an internal engagement region (18B, 20B, 22B, 24B) on the other side of said median plane, the two engagement regions are separated by recessed regions (26, 13) through which the median plane (P—P') passes, the half-casings (3) being connected by screw attachment means (37) extending within at least one insulating sleeve between adjacent conductive busbars (7), and wherein the insulating sleeve comprises two identical elementary sleeves (21) each forming part of one of the half-casings (3), each elementary sleeve comprising at least one outer tongue (23) and an inner tongue (25) which is angularly displaced with respect to the outer tongue and adapted to slide within the outer tongue of the elementary sleeve of the other half-casing.

21. A protective casing according to claim 20, wherein the tongues (23, 25) of each elementary sleeve are semi-cylindrical and angularly opposed and separated by two opposite axial slits (36) extending from the free end of the sleeve.

22. A protective casing according to claim 21, wherein the two slits (36) are located in one and the same plane perpendicular to the plane of the busbar array.

23. A protective casing according to claim 20, wherein the screw attachment means (37) comprise two elementary means disposed symmetrically on each side of said median plane (P—P'), and two sleeves constituted by elementary sleeves (21) with, in the case of each half-casing (3), two elementary sleeves of each half-casing which are offset from each other by translation.

24. A protective casing according to claim 20, there being a recess (31) adjacent to the outer face of the base of the inner tongues (25) and a recess (31) adjacent to the inner face of the base of the outer tongues (23), for receiving the free ends of the tongues of the sleeve of the other half-casing (3) at the end of travel in sliding motion up to the position of maximum compactness.

* * * * *